(12) United States Patent
Yabuzaki (10) Patent No.: US 10,291,133 B2
(45) Date of Patent: May 14, 2019

(54) SWITCHING POWER SUPPLY DEVICE (71) Applicant: FUJI ELECTRIC CO., LTD., Kawasaki-shi (JP)

(72) Inventor: Jun Yabuzaki, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 15/042,118

(22) Filed: Feb. 11, 2016

(65) Prior Publication Data
US 2016/0261200 A1 Sep. 8, 2016

(30) Foreign Application Priority Data

Mar. 2, 2015 (JP) .................................. 2015-040757

(51) Int. Cl.
*H02M 3/335* (2006.01)
*H02M 1/32* (2007.01)

(52) U.S. Cl.
CPC ......... *H02M 3/33523* (2013.01); *H02M 1/32* (2013.01); *H02M 3/33592* (2013.01); *H02M 2001/327* (2013.01); *Y02B 70/1475* (2013.01)

(58) Field of Classification Search
CPC . H02M 1/08; H02M 3/33546; H02M 3/33553
USPC ............... 363/21.06, 21.07, 21.14, 21.15, 97
See application file for complete search history.

(56) References Cited

U.S. PATENT DOCUMENTS

| 6,366,480 | B2* | 4/2002 | Hosotani | H02M 3/3385 363/21.02 |
|---|---|---|---|---|
| 7,773,392 | B2* | 8/2010 | Matsumoto | H02M 3/33592 363/21.07 |
| 7,876,583 | B2* | 1/2011 | Polivka | H02M 3/33523 363/21.14 |
| 8,437,152 | B2* | 5/2013 | Sato | H02M 3/33592 363/21.02 |
| 2009/0207637 | A1* | 8/2009 | Boeke | H02M 3/33592 363/21.14 |

(Continued)

FOREIGN PATENT DOCUMENTS

| JP | H07-059339 A | 3/1995 |
|---|---|---|
| JP | H11-206116 A | 7/1999 |

(Continued)

*Primary Examiner* — Jeffrey Sterrett
(74) *Attorney, Agent, or Firm* — Rabin & Berdo, P.C.

(57) ABSTRACT

A switching power supply device having a synchronous rectifier IC on a secondary side, responds to an anomaly on a primary side based on detecting an occurrence of the anomaly on the secondary side. When a secondary side synchronous rectifier IC detects an anomaly, a current is output from the anomaly-time current output terminal of the secondary side synchronous rectifier IC. By the output current flowing through a resistance, a voltage at an output voltage detection point is raised to increase a current through the cathode of a shunt regulator. In so doing, a current flowing through a photodiode of a photocoupler also increases, and the FB terminal voltage of a switching control IC connected to a primary side phototransistor decreases. The primary side switching control IC operates to minimize output power, reduces a secondary side output voltage, or stops an operation of the switching power supply device.

16 Claims, 6 Drawing Sheets

(56) References Cited

U.S. PATENT DOCUMENTS

| | | | |
|---|---|---|---|
| 2010/0188872 A1* | 7/2010 | Matsumoto | H02M 1/34 |
| | | | 363/21.06 |
| 2013/0107585 A1* | 5/2013 | Sims | H02M 3/33592 |
| | | | 363/21.14 |
| 2014/0301117 A1 | 10/2014 | Hirabayashi | |
| 2014/0369086 A1* | 12/2014 | Hayasaki | G03G 15/80 |
| | | | 363/21.14 |
| 2016/0079878 A1* | 3/2016 | Lin | H02M 3/33592 |
| | | | 363/21.14 |
| 2016/0190942 A1* | 6/2016 | Kikuchi | H02M 3/33507 |
| | | | 363/21.14 |
| 2016/0261200 A1* | 9/2016 | Yabuzaki | H02M 1/32 |
| 2016/0344296 A1* | 11/2016 | Luo | H02M 3/33523 |

FOREIGN PATENT DOCUMENTS

| | | |
|---|---|---|
| JP | 2008-54475 A | 3/2008 |
| JP | 2011-019317 A | 1/2011 |
| JP | 2012-120399 A | 6/2012 |
| JP | 2014-204573 A | 10/2014 |
| JP | 2015-27216 A | 2/2015 |

\* cited by examiner

FIG. 1

DIAGRAM SHOWING CONFIGURATION OF SWITCHING POWER SUPPLY DEVICE ACCORDING TO EMBODIMENT OF INVENTION

DIAGRAM WITH EQUIVALENT CIRCUIT OF SHUNT REGULATOR ACCORDING TO EMBODIMENT OF INVENTION REPRESENTED AS FUNCTIONAL BLOCK

FIG. 4

CIRCUIT BLOCK DIAGRAM SHOWING CONFIGURATION OF ANOMALY-TIME CURRENT OUTPUT TERMINAL SECTION PROVIDED IN SYNCHRONOUS RECTIFIER IC ACCORDING TO EMBODIMENT OF INVENTION

FIG. 5

FUNCTIONAL BLOCK DIAGRAM SHOWING CONFIGURATION OF CURRENT OUTPUT CIRCUIT ACCORDING TO EMBODIMENT OF INVENTION

FIG. 6
PRIOR ART
TYPICAL EXAMPLE SHOWING CONFIGURATION OF HERETOFORE KNOWN SWITCHING POWER SUPPLY DEVICE

SWITCHING POWER SUPPLY DEVICE

CROSS-REFERENCE TO RELATED APPLICATION

This application is based on, and claims priority to Japanese Patent Application No. 2015-040757, filed on Mar. 2, 2015, the contents of which are entirely incorporated herein by reference for all purposes.

BACKGROUND

1. Technical Field

The present disclosure relates to a switching power supply device in which a primary side and a secondary side are connected by a transformer, and a synchronous rectifier integrated circuit (IC) is used on the secondary side.

2. Description of Related Art

The control of an output voltage obtained on the second side of a switching power supply device has been carried out in the following way, and is shown in JP-A-2012-120399.

Figure 6:
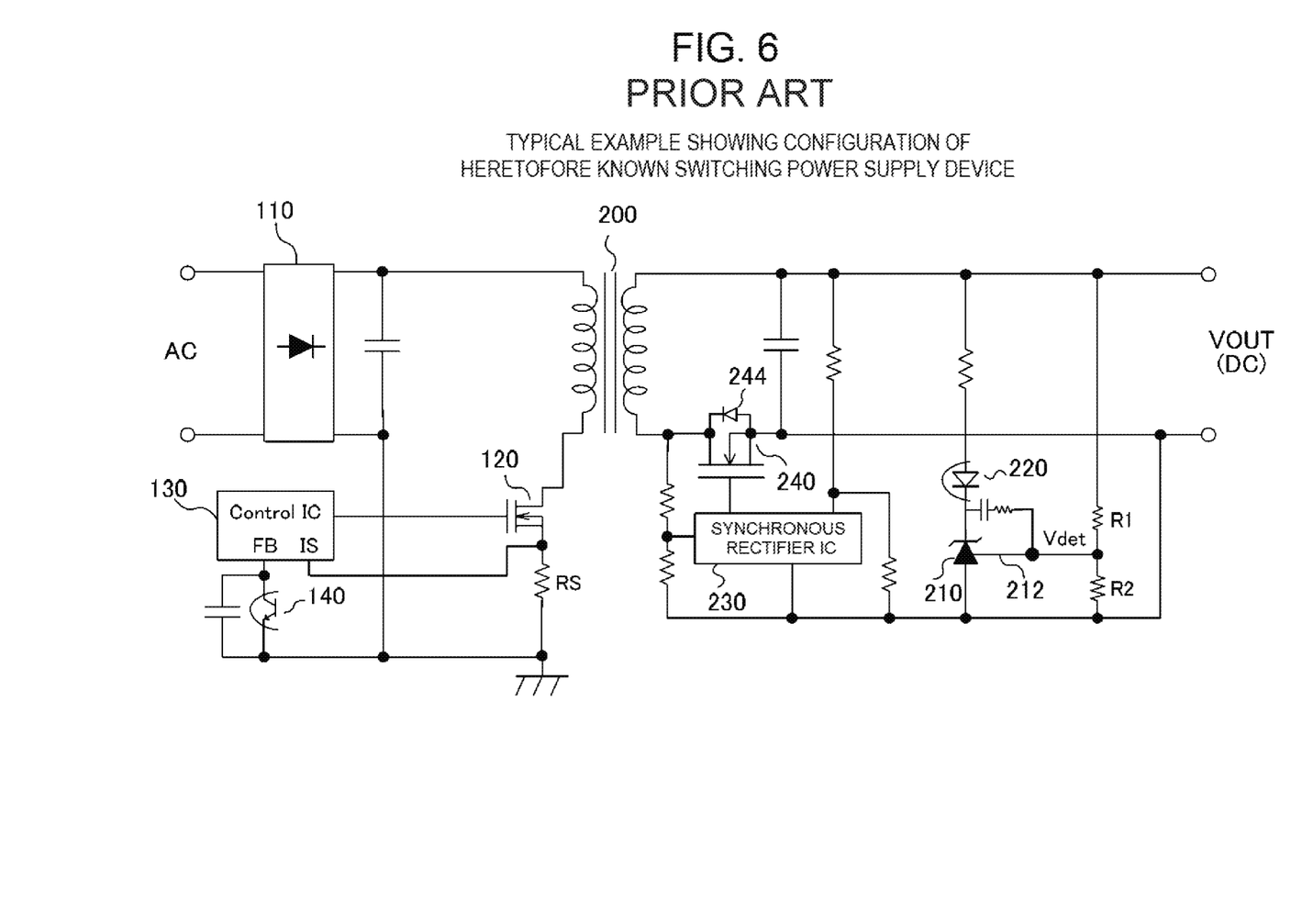
FIG. 6 is a typical example showing a configuration of a known switching power supply device.

FIG. 6 is an example showing a configuration of a switching power supply device using a known secondary side synchronous rectification system in which an AC-DC converter obtains a desired DC voltage from an AC voltage that is rectified by a diode bridge 110, a metal-oxide-semiconductor field-effect transistor (MOSFET), which acts as a switching element, and a transformer. The switching power supply device of FIG. 6 is a simplified version of FIG. 1 in JP-A-2012-120399.

Output voltage information is fed back to a primary side switching control IC 130 via a shunt regulator 210 and a photodiode 220 of a photocoupler, which are disposed on the secondary side of a transformer 200. The shunt regulator 210 controls a current flowing through the shunt regulator 210 using a voltage applied to a reference terminal 212. Herein, the voltage applied to the reference terminal 212 is Vdet whereas output voltage VOUT is divided by resistances R1 and R2.

The control IC 130 controls the switching of a MOSFET 120 disposed on the primary side, and keeps the output voltage VOUT obtained on the secondary side constant.

In the control IC 130, a current flowing to the MOSFET 120 is detected from the voltage of the IS terminal, a feedback voltage from the secondary side is detected at the FB terminal, and the current and the feedback voltage are compared, thereby determining the on-width when switching the MOSFET 120.

To improve the conversion efficiency of the switching power supply device, a MOSFET 240 acts as a synchronous rectification switching element, rather than a diode. MOSFET 240 is applied as a secondary side rectification element, thereby realizing the secondary side synchronous rectification system.

In FIG. 6, with regard to the voltage drop of a rectification element, the conversion efficiency of the switching power supply device is improved considering that $V_{ds}$ (a drain-source voltage) of the MOSFET 240, when turned on, can be lower than $V_f$ (a forward voltage) of a rectification diode, thereby reducing switching loss when under heavy load.

The secondary side synchronous rectification system, having a synchronous rectifier IC 230 disposed on the secondary side is also shown in FIG. 6. Synchronous rectifier IC 230 controls the MOSFET 240 on/off, but it has no function of stopping the switching power supply device when an anomaly occurs. The reason is that even though the synchronous rectifier IC 230 turns off the secondary side MOSFET 240, a primary side switching element continues to turn on/off, and thus the switching power supply device does not stop. What is even worse, a situation can arise in which the synchronous rectifier IC 230 turns off the secondary side MOSFET 240 causing the loss on the secondary side to become larger, and thus generating abnormal heat.

At this point, when the secondary side MOSFET 240 is turned off, a secondary side current continues to flow via a parasitic diode 244 between the drain and the source. When $V_f$ (a forward voltage) of the parasitic diode 244 is larger than $V_{ds}$ (the drain-source voltage) of the MOSFET 240, the switching loss becomes even larger by turning off the MOSFET 240.

SUMMARY

Therefore, the disclosure provides a switching power supply device having a synchronous rectifier IC on a secondary side, which can respond to an anomaly on a primary side based on detecting an occurrence of the anomaly on the secondary side, and thus can also stop an operation.

The disclosure provides a switching power supply device which obtains a desired voltage, as an input voltage, using a switching element and a transformer. A secondary side output voltage is detected by a shunt regulator disposed on the secondary side of the transformer, and output voltage information is fed back to a primary side control IC, via a photocoupler, as a feedback voltage, thus controlling the output voltage. Furthermore, a synchronous rectifier IC and a synchronous rectification switching element are disposed on the secondary side, and the synchronous rectification switching element is controlled in response to a primary side switching operation. In the switching power supply device, a configuration is such that when the synchronous rectifier IC detects an anomaly, a current is output, thus raising the detected voltage of the shunt regulator.

According to the disclosure, when the secondary side synchronous rectifier IC detects an anomaly, it is possible to respond to the anomaly on the primary side based on the anomaly detection.

DETAILED DESCRIPTION

Hereafter, a detailed description will be given of an implementation of the disclosure.

First, a description will be given of the basic principle of the disclosure. A secondary side synchronous rectifier IC, as it is a control IC disposed on the secondary side, should originally be able to detect an output voltage with good precision. As opposed to this, with a known configuration (refer to FIG. 1 of JP-A-2012-120399), as a detection of the output voltage is carried out by detecting the voltage of the auxiliary winding of a transformer with a primary side switching control IC, it is only possible to expect a precision of a few % to a few tens %.

However, by the function of transmitting information to the primary side via a shunt regulator being added to the synchronous rectifier IC disposed on the secondary side, it is possible to control the output voltage using a result of direct monitoring of the output voltage by the synchronous rectifier IC disposed on the secondary side, meaning that it is possible to realize the output voltage with a precision of 0.7% to 2%.

Also, the secondary side synchronous rectifier IC directly detects a current even when there is overload, thereby eliminating the need for a function, such as AC input voltage correction, relating to current detection which has been carried out on the primary side in the known configuration, and it is possible to further improve the precision. Hereafter, a specific description will be given of these points.

Figure 1:
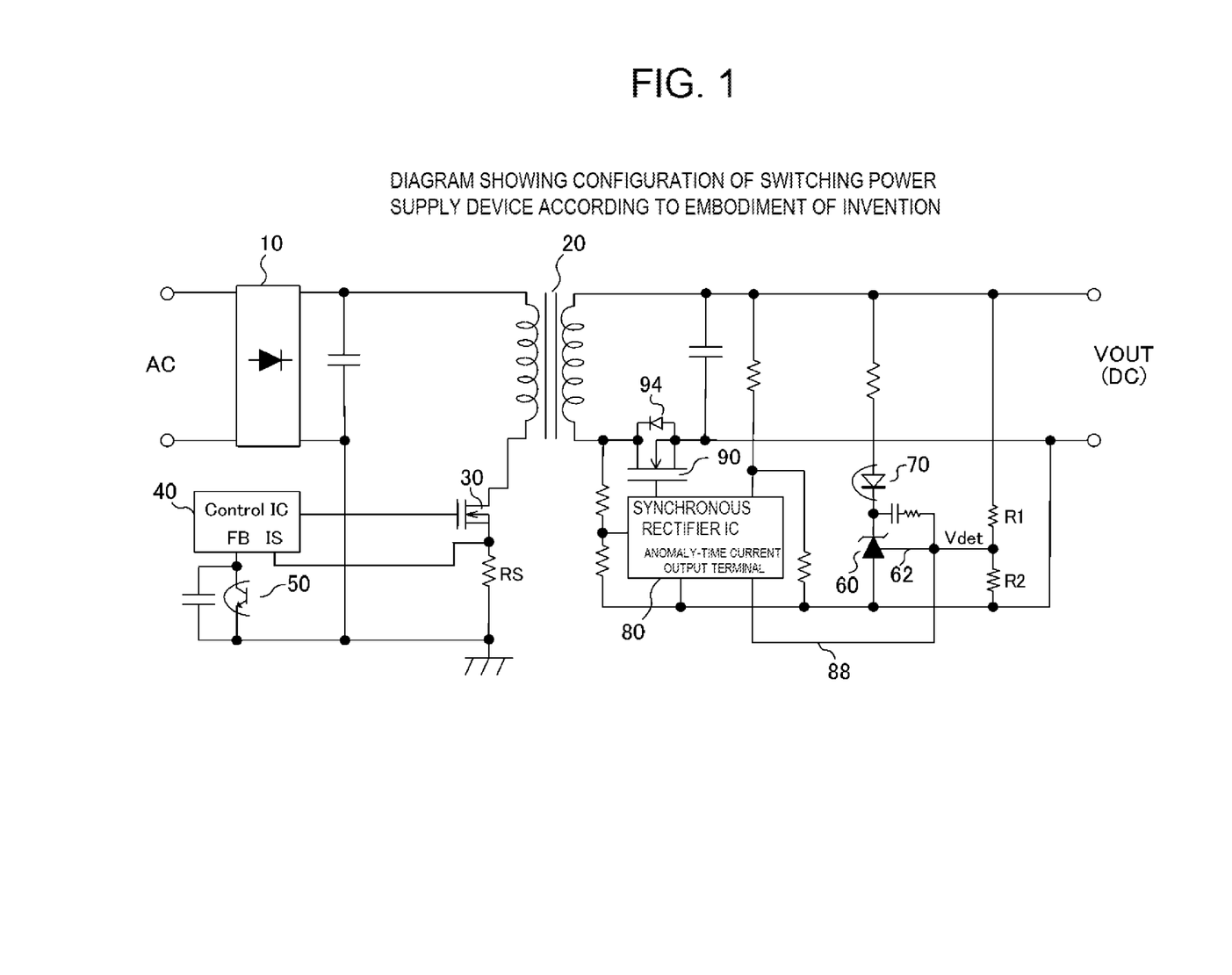
FIG. 1 is a diagram showing a configuration of a switching power supply device according to an implementation of the disclosure.

FIG. 1 is a diagram showing a configuration of a switching power supply device according to an embodiment of the disclosure. Also, FIG. 2 is a waveform diagram illustrating an anomaly-time operation of the switching power supply device according to the embodiment of the invention.

Figure 2:
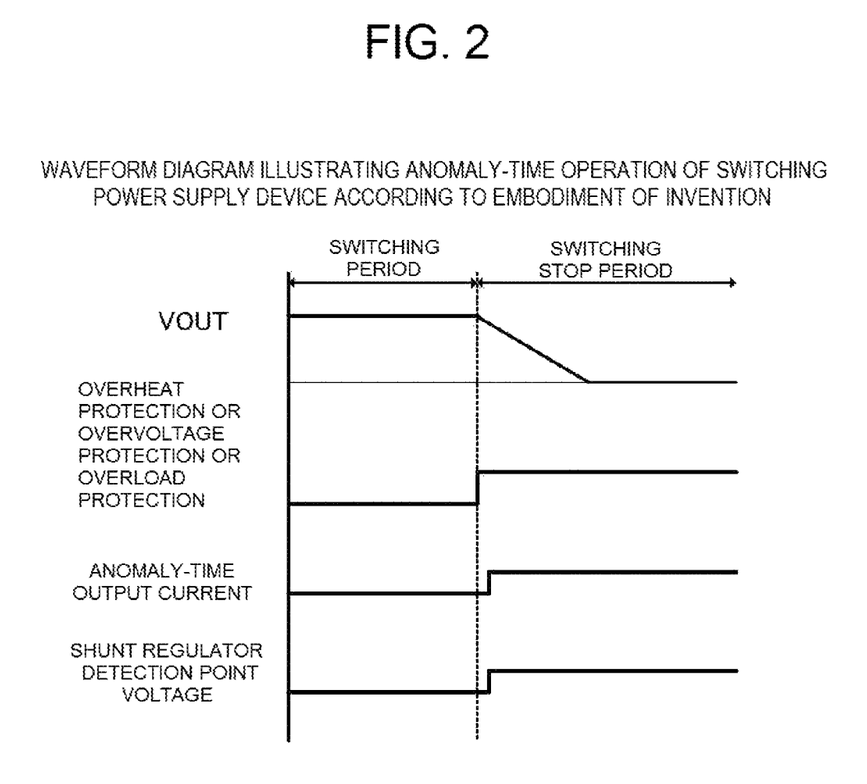
FIG. 2 is a waveform diagram illustrating an anomaly-time operation of the switching power supply device according to the implementation of the disclosure.

In FIGS. 1 and 2, when a secondary side synchronous rectifier IC 80, which controls a MOSFET 90 acting as a secondary side synchronous rectification switching element, detects an anomaly such as overheat, overvoltage, or overload, a current 88 is output from the anomaly-time current output terminal of the secondary side synchronous rectifier IC 80. The output current 88 flows through a resistance R2, thus raising a voltage Vdet (a voltage input into a detection terminal 62 of a shunt regulator 60) of the connection point of a resistance R1 and the resistance R2 which divide an output voltage VOUT. By so doing, the shunt regulator 60 determines that the output voltage VOUT has risen to more than necessary, and increases a current flowing through the cathode of the shunt regulator 60.

By so doing, a current flowing through a photodiode 70 of a photocoupler increases, and the amount of light emitted by the photodiode 70 also increases, while the on-resistance of a primary side phototransistor 50 which configures the photocoupler pairing with the photodiode 70 decreases, and the voltage of a feedback FB terminal of a primary side switching control IC 40 also decreases. The FB terminal is inside the control IC 40. The primary side switching control IC 40 determines, based on the decrease in the FB terminal voltage, that the output voltage VOUT has risen to more than necessary, and operates to lower the on-Duty of a MOSFET 30 acting as a primary side switching element, in such a way as to minimize output power, or change the switching frequency of the MOSFET 30 in a direction in which to lower the output power.

By so doing, the secondary side output voltage VOUT decreases. Eventually, the output voltage and the on-Duty or switching frequency change to a value at which the voltage Vdet determined by the current 88 and output voltage VOUT balances with a reference potential $V_{REF}$ to be described hereafter. Furthermore, by making the current 88 large to some extent and leaving a voltage drop of the resistance R2 due to the current 88 to be larger than the reference potential $V_{REF}$, a large current flows through the photodiode 70 when the current 88 flows, meaning that the primary side switching control IC 40 detects the flow of the large current, thus enabling the switching power supply device to attain a stopped state.

The secondary side synchronous rectifier IC 80, when an anomaly is detected, can maintain a protection operation, such as a stop of the switching power supply device, by continuing causing the current 88 to flow from the anomaly-time output terminal, and the secondary side synchronous rectifier IC 80, having a timer (not shown) therein, can also stop the current 88 flowing from the anomaly-time output terminal at a time determined by the timer (not shown) and restart the operation of the switching power supply device.

Figure 3:
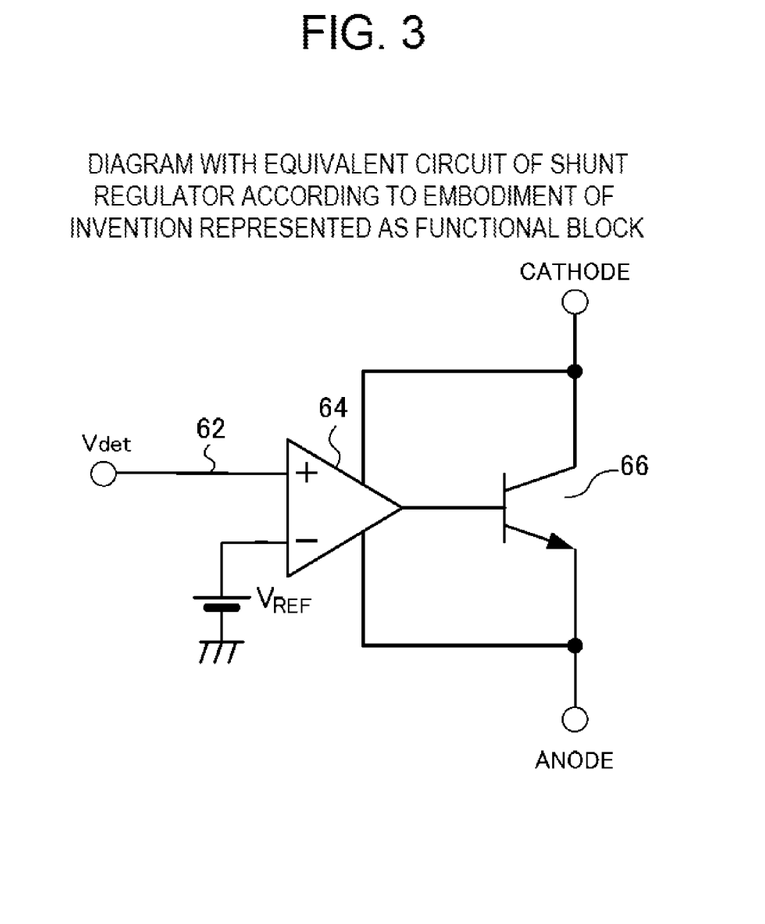
FIG. 3 is a diagram with an equivalent circuit of a shunt regulator according to the implementation of the disclosure represented as a functional block.

Also, FIG. 3 is a diagram with an equivalent circuit of the shunt regulator according to the implementation of the disclosure represented as a functional block. As shown in FIG. 3, an operation is such that a high precision reference potential $V_{REF}$ is applied to the inverting input terminal of an operational amplifier 64, the voltage Vdet where the output voltage VOUT is divided by the voltage dividing resistances R1 and R2 is applied to the non-inverting input terminal of the operational amplifier 64, the reference potential $V_{REF}$ and the output voltage Vdet are compared by the operational amplifier 64, and the output of the operational amplifier 64 controls an output transistor 66. When the voltage Vdet is higher than the reference potential $V_{REF}$, the base current of the output transistor 66 is increased, and the current flowing through the photodiode 70 is increased. Also, when the voltage Vdet is lower than the reference potential $V_{REF}$, the base current of the output transistor 66 is reduced, and the current flowing through the photodiode 70 is reduced.

As described, the increase or reduction in the current flowing through the photodiode 70, that is, the amount of light emitted by the photodiode 70 is transmitted to the primary side switching control IC 40, via the phototransistor 50, is information on the output voltage. The switching control IC 40, based on the information, carries out primary side switching control in such a way that Vdet=$V_{REF}$.

In the case of the shunt regulator, the voltage precision of the reference potential $V_{REF}$ can be set as being ±0.7% to ±2%, and as this is significantly advantageous compared with a reference voltage precision of ±a few % to ±a few tens % for a common zener diode, a shunt regulator is recently a part indispensable when a high precision reference voltage is necessary. For example, it is possible to achieve a higher precision power supply by using a shunt regulator in driving a photocoupler.

Figure 4:
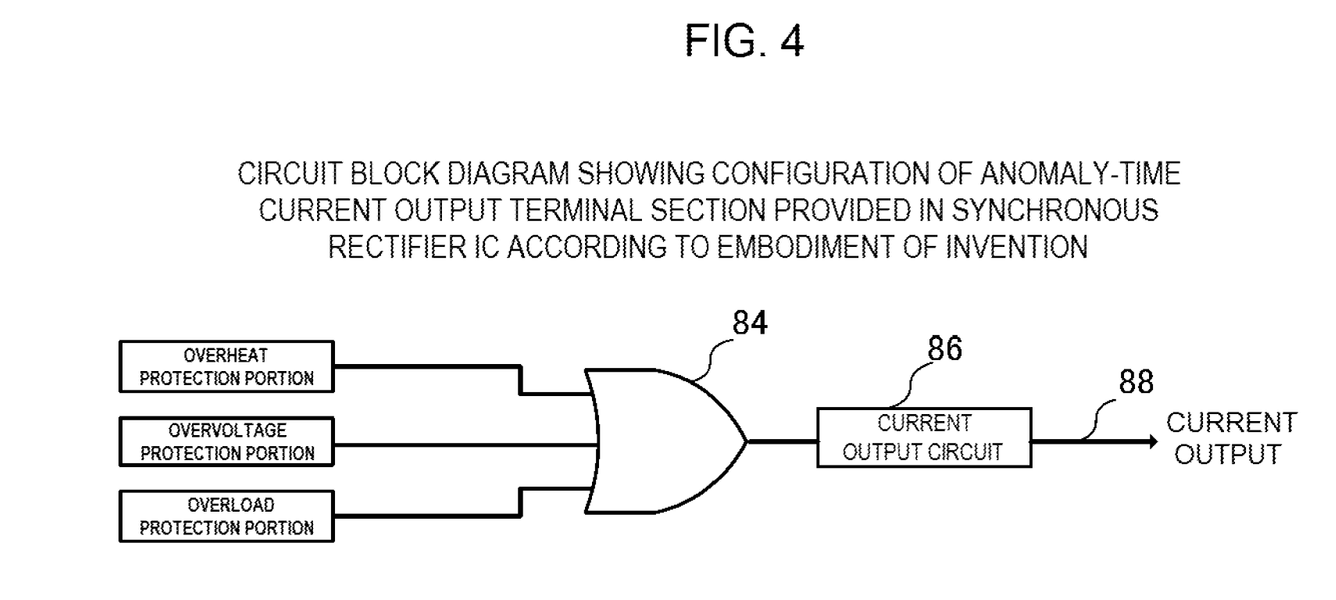
FIG. 4 is a circuit block diagram showing a configuration of an anomaly-time current output terminal section provided in a synchronous rectifier IC according to the implementation of the disclosure.

FIG. 4 is a circuit block diagram showing a configuration of an anomaly-time current output terminal section according to the embodiment of the invention. In FIG. 4, the anomaly-time current output terminal section is provided in the synchronous rectifier IC 80, and the respective functional blocks of overheat protection, overvoltage protection, and overload protection, framed by the rectangle, are functions (if necessary, as for overheat protection and overvoltage protection, for example, refer to FIG. 3 of JP-A-2008-104275, and as for overvoltage protection and overload protection, for example, refer to the control IC model number "FA3641" produced by Fuji Electric Co., Ltd.) provided in a control IC of a switching power supply device. In the disclosure, the functional blocks are provided in the synchronous rectifier IC 80, and when an anomaly is detected by any functional block, a detected signal is input into an OR circuit 84, and the OR circuit 84 outputs the signal to a current output circuit 86 (to be described hereafter). The current output circuit 86, when a voltage signal is input thereinto from the OR circuit 84, outputs the current 88 in the described way.

Figure 5:
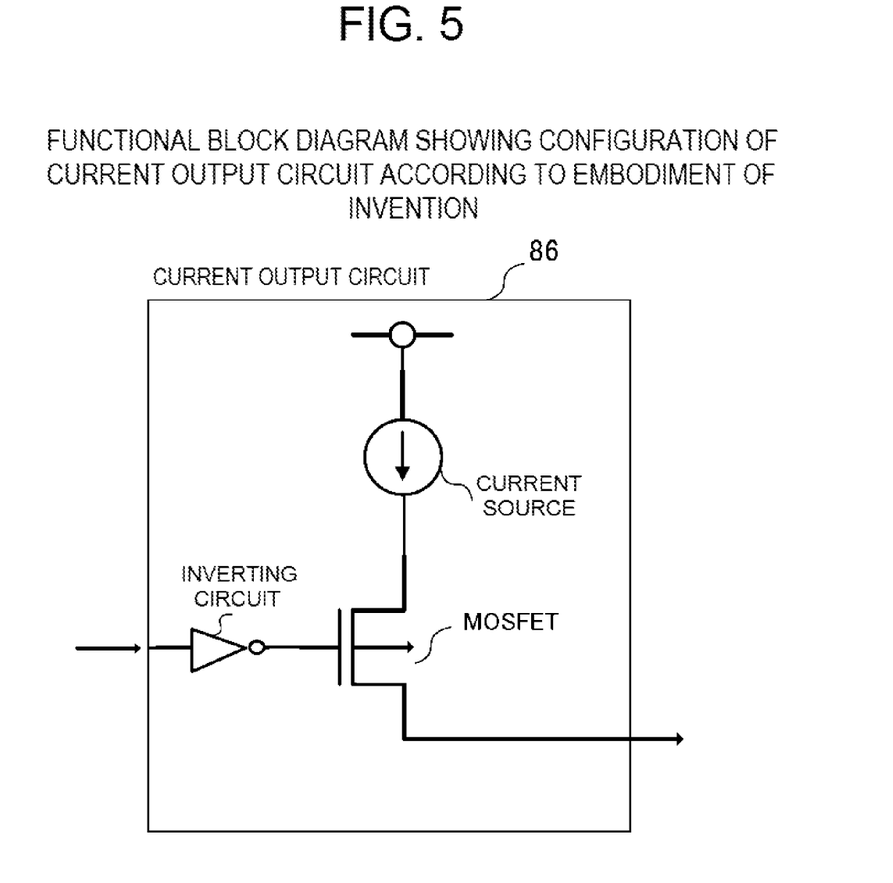
FIG. 5 is a functional block diagram showing a configuration of a current output circuit according to the implementation of the disclosure.

Also, FIG. 5 is a functional block diagram showing a configuration of the current output circuit according to the implementation of the disclosure. The output terminal of the OR circuit 84 shown in FIG. 4 is connected to the left end of FIG. 5, and in this example, when a high level signal is input into the output terminal, the high level signal is inverted by an inverter (an inverting circuit), and a low level signal is applied to the gate of a P-type MOSFET. Therefore, the P-type MOSFET is turned on and outputs the current from a constant current source.

In the implementation of the disclosure, a voltage to which an AC voltage is rectified by a diode bridge is used as an input voltage, but the output voltage of a direct current power supply may be used as the input voltage.

What is claimed is:

1. A switching power supply device comprising:
   a transformer having a primary side and a secondary side;
   a switching element disposed on the primary side;
   a primary side control integrated circuit (IC);
   a shunt regulator disposed on the secondary side, the shunt regulator detecting a secondary side output voltage;
   a photocoupler that provides output voltage information to the primary side control IC as a feedback voltage, the feedback voltage controlling the secondary side output voltage;
   a synchronous rectification switching element disposed on the secondary side, the synchronous rectification switching element being controlled in response to a primary side switching operation of the primary side switching element; and
   a synchronous rectifier IC disposed on the secondary side, the synchronous rectifier IC outputting an output current that raises the secondary side output voltage in response to the shunt regulator detecting an anomaly in the secondary side output voltage.

2. The switching power supply device of claim 1, wherein the synchronous rectifier IC includes a current output circuit,
   the current output circuit has a constant current source and an output terminal, and
   the constant current circuit is connected to the output terminal in response to the shunt regulator detecting the anomaly.

3. The switching power supply device of claim 1, wherein the synchronous rectifier IC outputs a signal indicative of the anomaly in response to detecting an overheat condition.

4. The switching power supply device of claim 1, wherein the synchronous rectifier IC outputs a signal indicative of the anomaly in response to detecting an overvoltage condition.

5. The switching power supply device of claim 1, wherein the synchronous rectifier IC outputs a signal indicative of the anomaly in response to detecting an overload condition.

6. The switching power supply device of claim 1, further comprising: a first resistance; and
   a second resistance coupled to the first resistance, wherein the secondary side output voltage is divided by the first resistance and the second resistance,
   the shunt regulator detects the secondary side output voltage based on a voltage between the first resistance and the second resistance,
   the synchronous rectifier IC outputs the output current to the second resistance in response to the shunt regulator detecting the anomaly, and
   the second resistance is connected to a low potential side reference potential of the secondary side of the transformer.

7. The switching power supply device of claim 6, wherein the synchronous rectifier IC outputs a signal indicative of the anomaly in response to detecting an overheat condition.

8. The switching power supply device of claim 6, wherein the synchronous rectifier IC outputs a signal indicative of the anomaly in response to detecting an overvoltage condition.

9. The switching power supply device of claim 6, wherein the synchronous rectifier IC outputs a signal indicative of the anomaly in response to detecting an overload condition.

10. The switching power supply device of claim 6, wherein
    the synchronous rectifier IC includes a current output circuit,
    the current output circuit has a constant current source and an output terminal, and
    the constant current circuit is connected to the output terminal in response to the shunt regulator detecting the anomaly.

11. A switching power supply device comprising:
    a transformer having a primary side and a secondary side;
    a shunt regulator disposed on the secondary side, the shunt regulator being configured to detect a secondary side output voltage;
    a synchronous rectification switching element disposed on the secondary side, the synchronous rectification switching element being controlled based on the secondary side output voltage detected by the shunt regulator; and
    a synchronous rectifier integrated circuit (IC) disposed on the secondary side, the synchronous rectifier IC being configured to output an output current that raises the secondary side output voltage in response to the shunt regulator detecting an anomaly in the secondary side output voltage.

12. The switching power supply device of claim 11, further comprising:
    a primary side control integrated circuit (IC); and
    a photocoupler configured to output voltage information to the primary side control IC as a feedback voltage, the feedback voltage controlling the secondary side output voltage.

13. The switching power supply device of claim 12, wherein the feedback voltage controls the secondary side output voltage.

14. The switching power supply device of claim 11, further comprising:
    a switching element disposed on the primary side, wherein
    the synchronous rectification switching element is controlled in response to a primary side switching operation of the primary side switching element.

15. The switching power supply device of claim 11, wherein
    the synchronous rectifier IC includes a current output circuit,
    the current output circuit has an output terminal, a constant current source and another switching element,
    the other switching element being configured to receive a constant current from the constant current source, and output the output current to the output terminal in response to the shunt regulator detecting the anomaly.

16. The switching power supply device of claim 14, wherein the synchronous rectification switching element is controlled to reduce the secondary side output voltage in response to the primary side switching operation of the primary side switching element.

* * * * *